Figure 1:
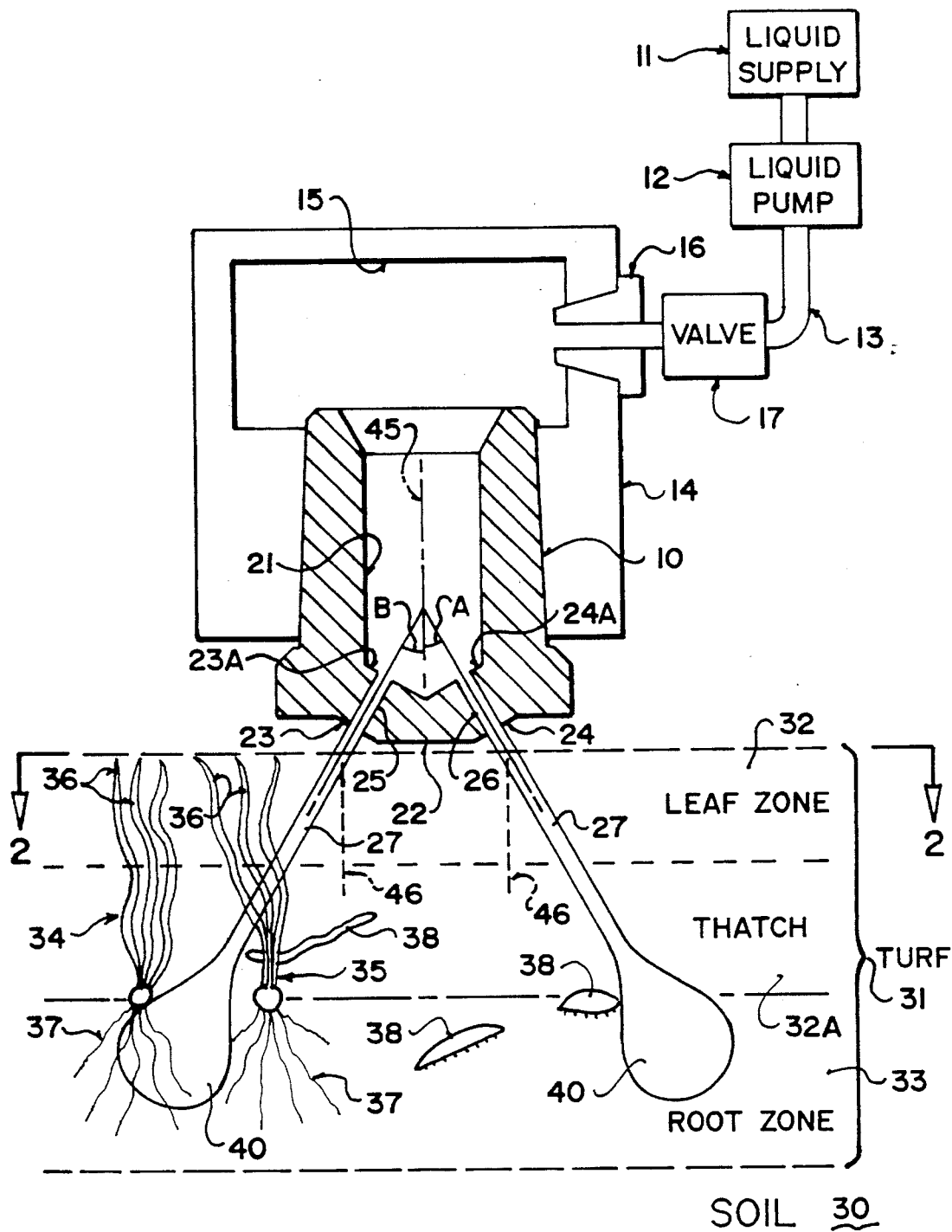

United States Patent [19]

Rogers

[11] Patent Number: 5,575,224

[45] Date of Patent: Nov. 19, 1996

[54] INJECTION TIP FOR LIQUID DISTRIBUTION IN A TURF ROOTZONE

[76] Inventor: Ramon B. Rogers, 626 - 47th Street E., Saskatoon, Saskatchewan, Canada, S7K 5X3

[21] Appl. No.: 372,922

[22] Filed: Jan. 17, 1995

[51] Int. Cl.⁶ ........................................ A01C 23/04
[52] U.S. Cl. .............................. 111/118; 172/21; 239/754
[58] Field of Search .................................... 111/118, 127, 111/119; 172/21, 22; 405/269; 239/754

[56] References Cited

U.S. PATENT DOCUMENTS

| | | | |
|---|---|---|---|
| 3,726,481 | 4/1973 | Foster et al. | 239/754 |
| 3,815,525 | 6/1974 | Kainson et al. | 111/127 |
| 3,875,876 | 4/1975 | Pustovoit et al. | 111/127 |
| 4,009,666 | 3/1977 | Russell et al. | 239/754 |
| 4,903,618 | 2/1990 | Blair | 111/118 |
| 4,907,516 | 3/1990 | Rogers . | |
| 5,101,745 | 4/1992 | Podevels et al. | 172/21 |
| 5,119,744 | 6/1992 | Comer | 172/21 |
| 5,207,168 | 5/1993 | Comer | 172/21 |
| 5,370,069 | 12/1994 | Monroe | 172/21 |
| 5,394,812 | 3/1995 | Dunning et al. | 111/127 |
| 5,407,134 | 4/1995 | Thompson et al. | 111/118 |

FOREIGN PATENT DOCUMENTS

| | | | |
|---|---|---|---|
| 1323003 | 7/1987 | U.S.S.R. | 111/118 |
| 1512509 | 10/1989 | U.S.S.R. | 111/118 |

OTHER PUBLICATIONS

Brochure—Cérmaniques Techniques Desmarquest (2 pages).
Brochure—FogJet (2 pages) by Spraying Systems Co. of Wheaton Illinois.

*Primary Examiner*—Spencer K. Warnick, IV
*Attorney, Agent, or Firm*—Adrian D. Battison; Murray E. Thrift

[57] ABSTRACT

A pulsed injection system for injecting a stream of high pressure liquid into the ground is used for distributing liquid in a turf root zone. Each nozzle of the apparatus includes one or more nozzle openings which are arranged at an angle to the vertical so that the stream generated is not vertical but instead projects outwardly from the nozzle with a partly horizontal component of direction. This direction maximizes the distance traveled through the root zone of the turf to kill maximum numbers of parasites and also, particularly when the number of openings per nozzle is increased to four provides a maximum blanket of the injected liquid in an expansion zone of each jet with minimum spaces between the expansion zone and maximum coverage. This blanket is used particularly with herbicide injection to prevent weeds growing through the herbicide into the turf.

26 Claims, 3 Drawing Sheets

INJECTION TIP FOR LIQUID DISTRIBUTION IN A TURF ROOTZONE

BACKGROUND OF THE INVENTION

This invention relates to a method of distributing liquid in a turf root zone of turf growing on a soil surface, the turf including a first layer of grass including leaves a second layer of thatch including dead leaves and stems and a third layer including the root zone.

The present inventor in U.S. Pat. No. 4,907,516 issued Mar. 13, 1990 discloses a device for pulsed injection into the ground of liquid fertilizer. The techniques disclosed in this patent have been developed into a machine which is particularly useful for injecting liquid into turf in golf courses and similar situations where a high quality turf condition is required. The machine can be used for injecting various liquids, mainly water based, including pesticides, fertilizers, soil amendments, biologicals, polymers and aeration liquids. The machine has the advantage of ensuring that the liquids are placed under the leaves and thatch of the turf and this has the following advantages.

a) Subsurface placement mitigates surface toxicity.

b) Subsurface placement maximizes pesticide efficacy.

c) Injection of aeration liquids relieves surface compaction and heat stress.

d) Injection of aeration liquids improves green pliability immediately.

The main concern of the above patent was that of obtaining a maximum depth of penetration since the prior art up till that time had been unable to obtain the required penetration depth to obtain proper placement of pesticides, fertilizer and similar materials. The techniques shown in the patent provided an injection nozzle which had a single injection nozzle opening projecting vertically downwardly so as to generate a solid stream of the liquid which is injected vertically downwardly into the soil to obtain maximum depth. Maximum depth is further obtained by injecting the material from the nozzle opening in a series of pulses so that the pressure of the liquid can be maximized without the necessity for injecting large quantities of the liquid. The series of pulses therefore provide injection of the liquid into the soil at a series of locations spaced along a direction of movement of the machine.

The machine manufactured according to the patent provides a single row of the injection nozzles across the width of the machine which in one practical example are spaced at three inch spacing. The spacing of the individual pulses in the direction of movement can therefore be adjusted by changing the time and spacing between the pulses or by changing the forward velocity of the machine. In one particular example, the spacing between the pulses in the direction of movement can be either three inches or can be reduced to one and a half inches for increased application or more for decreased application.

It is known in spray nozzles for example those sold under the trademarks Fogjet and Twinjet manufactured by Spraying Systems Co of Wheaton Ill. to provide a plurality of nozzle tips on a single nozzle which direct spray outwardly from the nozzle in a plurality of different directions. Generally these nozzle tips are arranged to generate an atomized spray for maximizing a spray coverage. Certainly these nozzle tips are entirely unsuitable for injecting liquid into the ground since the nozzles do not and cannot provide a solid stream of the liquid which is necessary to penetrate the soil surface.

It is yet further known to provide nozzles for dribbling liquid onto a standing crop which include more than one nozzle opening. Thus for example nozzles manufactured by Spraying Systems define three jets or streams which are formed as a solid stream of the liquid. However the nozzle is mounted at a spacing well above the soil surface and the liquid to be dispensed is supplied at very low pressure so as to dribble or trickle liquid down from the raised position through the leaves of a standing crop onto the ground with minimum contact with the crop to minimize burning or damage to the crop from the toxicity of the liquid.

However none of these prior art arrangements are in any way concerned with the subject matter of the above patent and the present invention which provides the injection of liquids directly into the soil from a position closely adjacent the soil with high pressure liquid and none of the prior art provides any teaching nor disclosure concerning the placement of the liquid in the sub soil condition.

SUMMARY OF THE INVENTION

It is one object of the present invention to provide an improved method of distributing liquids in the root zone of the turf using the techniques generally described in the above patent of injecting pulses of liquid into the soil.

According to one aspect of the invention there is provided a method of applying liquid to turf growing on a soil surface, the turf comprising a first layer of grass including leaves, a second layer of thatch having a layer of dead leaves and stems and a third layer comprising a root zone in which the lower ends of the roots engage into the soil, the method comprising providing a liquid injection nozzle having at least one nozzle opening, generating a liquid under pressure for injection through the nozzle opening, shaping the nozzle opening to generate a solid stream of the liquid, releasing the liquid under pressure through the nozzle opening in a series of sequential pulses, moving the nozzle across the turf in a direction of movement such that the series of sequential pulses inject liquid into the soil of a series of locations spaced along the direction of movement, locating the nozzle at a position above the soil surface and closely adjacent to the soil surface at a height to pass over the leaves and thatch, defining the pressure of the liquid relative to the transverse dimension of the stream so as to cause the liquid stream to penetrate through the first and second layers at least into the third layer of the root zone, and directing the solid stream of liquid of each pulse at an angle to a vertical line through the soil surface at the respective one of the locations.

Preferably the nozzle includes two nozzle openings and the nozzle openings are arranged symmetrically relative to a vertical center line centrally of the nozzle.

Preferably the nozzle is rotated about the center line so that one opening projects forwardly and to one side and the other opening projects rearwardly and to the other side.

Alternatively the nozzle can include four or more nozzle openings with the nozzle rotated about the center line so that the openings are arranged with one of the nozzle openings arranged to project forwardly and to one side, one of the nozzle openings arranged to project rearwardly and to said one side, one of the nozzle openings arranged to project forwardly and to the other side and one of the nozzle openings arranged to project rearwardly and to said other side.

Preferably there is provided a pesticide or herbicide in the liquid and the method includes forming a blanket of the pesticide in the root zone by providing a plurality of nozzle openings in each nozzle and directing the solid stream of liquid from each nozzle at said angle to the vertical line such that the pesticide spreads horizontally to form said blanket.

Preferably the method includes the step of killing worms or other parasites in the root zone by directing the solid stream at said angle through the root zone so as to increase the distance travelled through the root zone/thatch interface to maximize the number of parasites impacted by the stream of liquid. As is known, the parasites including particularly white grubs live at the bottom of the thatch, in the root zone and particularly at the interface therebetween.

The use of the injection nozzle opening which is directed at an angle to the vertical provides improved efficacy in locating the liquids to be injected. Contrary to the disclosure in the above patent in which the achievement of maximum depth is required, the arrangement of the present invention clearly reduces the depth which can be achieved but instead allows the liquids to be located in the root zone and at the interface between the root zone and the thatch with the angle either providing an improved blanket of the liquid in the soil zone immediately adjacent the root zone or alternatively the angle of the liquid passing through the layers increases the length of the path passing through the layers and thus increases the number of parasites impacted by the liquid stream as it passes through the root zone thus controlled thereby.

One embodiment of the invention will now be described in conjunction with the accompanying drawings in which:

BRIEF DESCRIPTION OF THE DRAWINGS

FIG. 1 is a vertical cross sectional view through a pulse injector system according to the present invention showing the passage of the pulses through the turf into the root zone and the soil zone.

FIG. 2 is a cross sectional view along the lines 2—2 showing the placement of the liquids.

FIG. 3 is a similar cross sectional view of that of FIG. 2 showing the placement of liquids using four nozzle openings to provide a blanket of the liquid at the top of the soil zone.

In the drawings like characters of reference indicate corresponding parts in the different figures.

DETAILED DESCRIPTION

The apparatus for injecting liquid into the ground is shown schematically in FIG. 1 and more detail of this arrangement in U.S. Pat. No. 4,907,516 mentioned above, the disclosure of which is incorporated herein by reference.

The apparatus comprises a nozzle generally indicated at 10 which is supplied with liquid from a liquid supply 11 through a high pressure pump 12. The high pressure liquid is supplied along a line 13 which comprises one of a plurality of such lines communicating the liquid from the pump 12 to a plurality of the nozzles 10 arranged in a row transversely to a direction of travel of the apparatus. The supply line 13 connects with a mounting block 14 which includes a chamber 15 for receiving the liquid under pressure from the supply line 13. The supply line is connected by a plug 16 to the mounting block 14. A valve 17 is shown schematically through which the liquid can escape into the nozzle 10.

The nozzle 10 is mounted in the mounting block 14 and supported thereby so that a bottom surface 22 of the nozzle is arranged in a horizontal position and carried by the mounting block 14 at a position closely adjacent a layer of turf to be injected by the apparatus.

The nozzle 10 thus includes the horizontal base surface 22 together with a pair of inclined side surfaces 23 and 24. The inclined side surfaces each have a respective one of a pair of bores 25 and 26 drilled therethrough so as to extend at right angles to the surface 23, 24 and to pass through the body of the nozzle 10 into the hollow interior 21 for communicating with the liquid within the hollow interior. The diameter of the bores 25 and 26 is relatively small in comparison with the diameter of the cylindrical interior 21 of the nozzle. The length of the bore is arranged so that the pulse of liquid within the hollow interior 21 of the nozzle escapes through the bore and is shaped by the bore into a stream of liquid. The point of emergence of the bore through the surface 23, 24 is arranged to be smooth, clean and circular so that the liquid escaping from the surface remains in the solid stream and is not broken by that surface by turbulence into a spray pattern or droplets. The smooth passage of the liquid therefore through the bore causes the generation of a smooth stream 27 of the liquid which is generally cylindrical as it emerges from the bore and remains cylindrical due to its high velocity until that velocity is slowed by impact with any elements beyond the end of the bore. The surface 23A and 24A on the inside of the nozzle through which the bores 25 and 26 pass are parallel to the respective one of the surfaces 23 and 24 and this controls the pulse jet of liquid to maximize the distance travelled by the jet.

The diameter of the bores 25 and 26 generally lies in the range 0.13 to 0.125 inch. In a typical example, the pressure of liquid will be of the order of 6000 PSI and the time period or pulse during which the valve pin is open will be of the order of 6 to 40 milliseconds. This generates a stream of the liquid having a diameter substantially equal to that of the bore and a velocity sufficient to penetrate the turf and soil beneath the turf. The mounting arrangement which holds the nozzle in position closely adjacent the space from the ground is not shown since this will be apparent to one skilled in the art and one example is shown in the above patent.

The apparatus is particularly designed for use in maintaining turf shown in FIG. 1 which includes a soil zone 30 and a layer of turf lying on the soil zone indicated at 31 and including a leaf zone 32, a thatch layer 32A and a root zone 33. The turf includes a layer of grass plants indicated schematically at 34 and 35 which includes leaves 36 and roots 37, the latter projecting into the root zone and forming with the soil in the root zone a mat which holds the plant in place on the soil.

The roots thus engage from the base of the mat into the soil to varying depths so that some of the roots project deeper and some of the roots lie in a mat closer to the surface.

One particular problem with growing high quality turf is that of parasites such as white grubs which live in the root zone just below the thatch and eat the roots thus killing the plants and interfere with the proper growth of the required mat of high quality grass leaves. The worms or grubs are schematically indicated at 38.

It has been determined by experimentation that the tendency of the jet or stream of liquid 27 within the turf and soil is that the stream passes through the leaf zone with little resistance but engages into the more dense mat of the thatch and the root zone so that the stream tends to slow within the thatch and root zone causing it to expand transversely into an expansion zone schematically indicated at 40. Thus schematically the path of the stream is illustrated as a cylinder followed by a spherical expansion zone but in practice this does not exactly occur and the stream will gradually expand as is disperses transversely due to impacts with the soil and other materials. However it is clear that the continued impact of the liquid with the soils and other materials tends to slow the liquid finally slowing rapidly and expanding transversely to spread into the soil at the expansion zone. The high speed generally cylindrical stream of the liquid tends initially to displace the soil and plant material thus forming a path therethrough but as the liquid slows it has less tendency to displace the soil and plant material and thus merges therewith in the expansion zone in which the liquid is mixed with the soil and plant material and absorbed into the interstices therebetween.

In the arrangement of the present invention, instead of directing the liquid vertically downwardly through a single central orifice as shown in the above prior patent, the liquid is discharged through two or more nozzle openings 25, 26 and these are arranged at an angle to a vertical centre line 45 of the nozzle and therefore to an imaginary line 46 which is at right angles to the soil or to the turf at the point of impact of the stream with the turf.

This angle of injection is indicated at angles A and B and can lie in the range up to 70°. Preferably the angle lies in the range 60 to 30 degrees.

Contrary therefore to the arrangement shown in the prior patent where the liquid injects vertically downwardly and thus achieves maximum depth, in this arrangement the liquid is injected in a direction which includes a vertical component downwardly into the soil and also a sideways component horizontally away from the nozzle.

Figure 2:
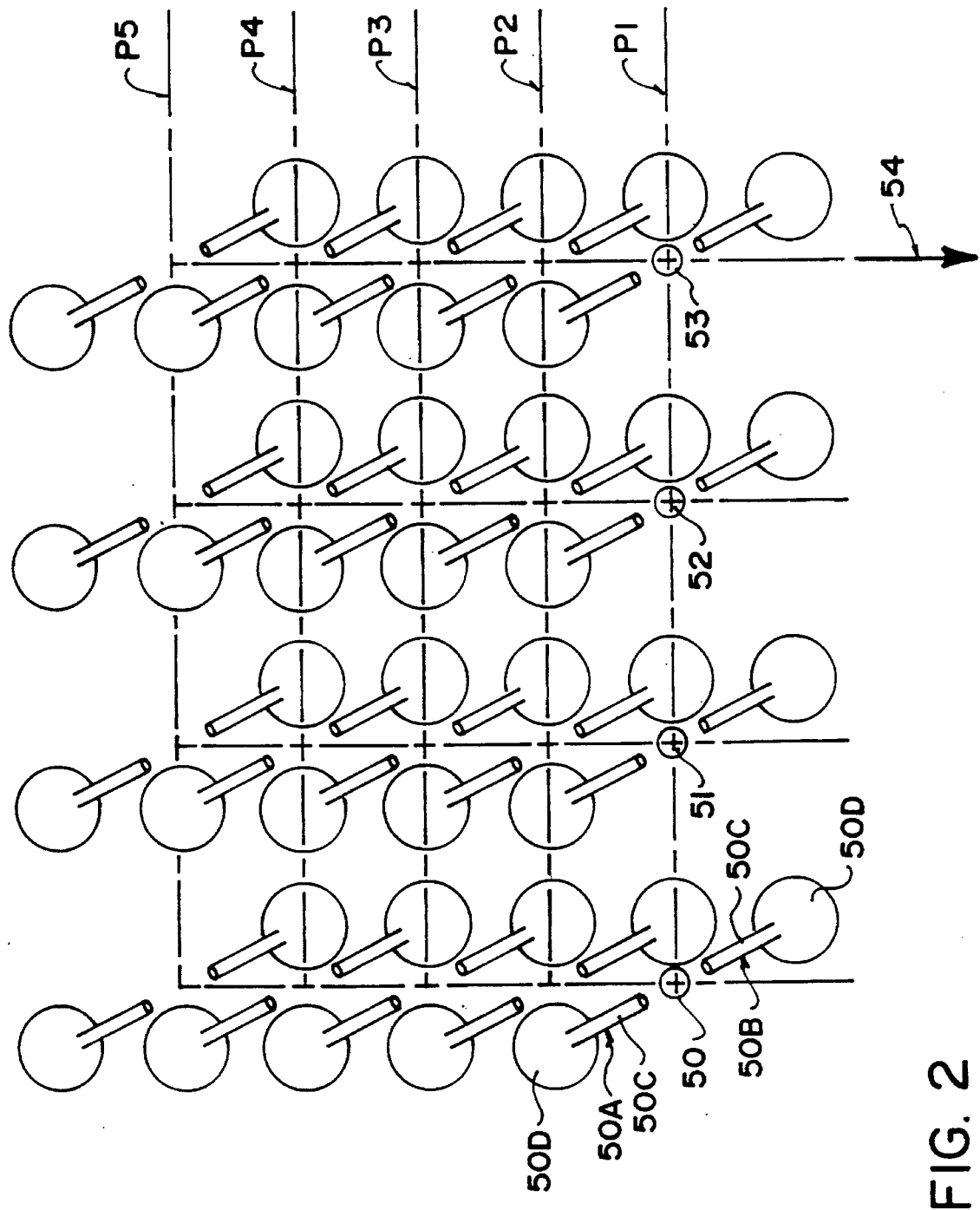

Turning now to FIG. 2 there is shown schematically a distribution pattern of the nozzles of the array relative to the direction of travel of the support system (not shown) carrying the nozzles across the ground. Thus the array of nozzles are indicated schematically at 50, 51, 52 and 53. Each of the nozzles is moving forwards in a direction of travel 54 and thus each has moved forwardly to a final position shown at P1 from a plurality of previous positions shown at P2, P3, P4 and P5. At each of the positions the valve is operated so that each nozzle injects pulses of the liquid into the ground at the respective pulse positions P1 through P5.

It will be noted from the drawing that each nozzle, for example nozzle 50, produces two streams 50A and 50B of the liquid including the cylindrical portion 50C and the expansion zone indicated at 50D. The streams and the associated nozzle openings are arranged symmetrically about a center line of the nozzle so as to lie in a common plane. It will be further noted that the nozzle and the common plane defined thereby is rotated about its central vertical axis by an angle less than 45 degrees so that instead of the streams being arranged symmetrically about a vertical plane parallel to the direction of travel, one stream is projected to one side of that vertical plane and also forwardly and the other stream is projected to the other side of that vertical plane and rearwardly.

This arrangement of the nozzles allows use of an angle A and B which is greater than 45° without causing the streams to be projected outwardly to the side of the nozzle to a distance that they interfere with the streams of the next adjacent nozzle. Thus some of the horizontal or sideways component of the direction of the stream is taken up with forward or rearward movement of that stream rather than directly to the side to lay out the expansion zones in a rectangular array of rows and columns. Thus for example, with a spacing between the nozzles 50, 51 of three inches, between the nozzles are laid two rows of the expansion zones which are side by side with the expansion zones being equally spaced in the transverse direction.

This inclination of the cylindrical portion of the liquid stream thus causes the liquid to pass through the thatch at an angle to the vertical so as to increase the distance of travel of each stream as it passes to the thatch/root zone interface. This increase in distance of travel through the thatch and the interface significantly increases the chance of impact of the stream with one of the grubs 38. An increase in distance traveled of 50% will increase by the same proportion the probability of impact with the worms and it is determined that such impacts provide a killing effect on the worms.

Figure 3:
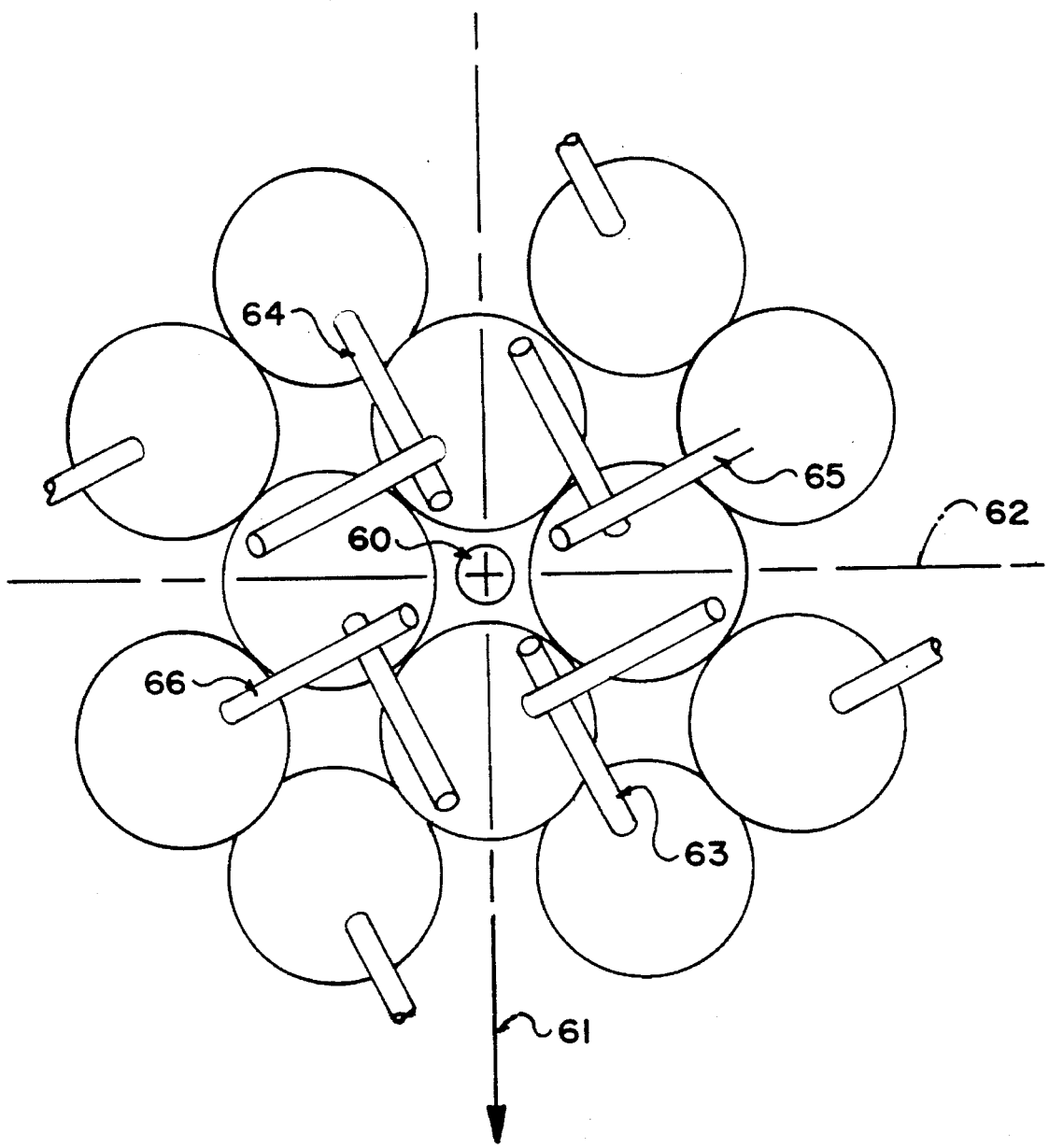

Turning now to FIG. 3, there is shown a view similar to that of FIG. 2 in which each nozzle has four outlet nozzle openings. One of the nozzles is indicated at 60. Again the nozzle openings are symmetrical about the center line. Each of the openings projects outwardly from the central axis of the nozzle with the openings arranged at 90° spacing in effect around the central axis. However the nozzle is rotated through an angle less than 45° so that instead of the nozzles projecting parallel to the direction of travel indicated at 61 and at right angles to the direction of travel, the nozzles project at a shallow angle to the direction of travel and that a shallow angle to the line 62 at right angles to the direction of travel. Thus the nozzles are arranged in two pairs with one nozzle generating a stream 63 projecting forwardly and slightly to one side of the direction of travel and a second nozzle of the pair indicated at 64 projecting rearwardly and outwardly to the opposed side of the direction of travel by the same shallow angle. Similarly the second pair generating streams 65 and 66 are arranged to project outwardly to the sides but also at a shallow angle to the sideward direction 62. This arrangement generates a pattern of the expansion zones as shown in which overlapping of the expansion zones is minimized and the expansion zones are formed into an array of parallel rows and columns minimizing the space between the expansion zones. In the theoretical arrangement shown in FIG. 3, the expansion zones are shown to touch without overlapping thus maximizing the coverage of the material in the root zone. This forms therefore a blanket of the liquid at the top of the root zone with that blanket covering as far as possible all areas of the top of the root zone without overlapping of the expansion zones of the streams. This blanket shown in FIG. 3, therefore provides substantially full coverage of the top of the soil which is particularly useful when injecting a herbicide or pesticide since the pesticide thus forms a blanket in the root zone preventing weeds from penetrating that blanket and reaching the surface.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of applying liquid below an upper surface of turf, the turf comprising a first layer of grass including leaves, a second layer of thatch having a layer of dead leaves and stems and a third layer comprising a root zone in which the roots engage into the soil, the method comprising providing a liquid injection nozzle having at least one nozzle opening, generating a liquid under pressure for injection through the nozzle opening, shaping the nozzle opening to generate a penetrating stream of the liquid, releasing the liquid under pressure through the nozzle opening in a series of sequential pulses, moving the nozzle across the turf in a direction of movement such that the series of sequential pulses inject liquid into the soil at a series of locations spaced along the direction of movement, locating the nozzle at a position above the soil surface and closely adjacent to the soil surface at a height to pass over the leaves and thatch, and directing the stream of liquid of each pulse at an angle to a vertical line through the soil surface at the respective one of the locations, the angle being arranged and the pressure of the liquid relative to a transverse dimension of the stream being set so as to cause the liquid stream to penetrate through the first and second layers at least into the third layer of the root zone.

2. The method according to claim 1 including arranging the angle and the pressure so as to spread the liquid within the root zone.

3. The method according to claim 1 including arranging the angle and pressure so as to spread the whole of the liquid partly in the third layer of the root zone and partly in the second layer of the thatch.

4. The method according to claim 1 wherein the angle from the vertical line is in the range 45 to 70 degrees.

5. The method according to claim 1 wherein each nozzle includes a plurality of nozzle openings each arranged at an angle from the vertical line.

6. The method according to claim 5 wherein the nozzle openings are arranged symmetrically relative to a vertical center line of the nozzle.

7. The method according to claim 6 wherein the nozzle includes two openings and is rotated about the center line so that one opening projects forwardly and to one side and the other opening projects rearwardly and to the other side.

8. The method according to claim 7 wherein the nozzle is rotated about the vertical center line by an angle less than 45 degrees.

9. The method according to claim 6 wherein the nozzle includes four nozzle openings and wherein the nozzle is rotated about the center line so that the openings are arranged with one of the nozzle openings arranged to project forwardly and to one side, one of the nozzle openings arranged to project rearwardly and to said one side, one of the nozzle openings arranged to project forwardly and to the other side and one of the nozzle openings arranged to project rearwardly and to said other side.

10. The method according to claim 9 wherein the nozzle is rotated about the vertical center line by an angle less than 45 degrees.

11. A method of applying liquid below an upper soil surface of an agricultural crop, the method comprising providing a liquid injection nozzle having at least one nozzle opening, generating a liquid under pressure for injection through the nozzle opening, shaping the nozzle opening to generate a penetrating stream of the liquid, releasing the liquid under pressure through the nozzle opening, moving the nozzle across the crop in a direction of movement such that the liquid is injected into the soil at a series of locations along the direction of movement, locating the nozzle at a position above the soil surface and closely adjacent to the, soil surface at a height to pass over the soil with the crop thereon, and directing the stream of liquid at an angle to a vertical line through the soil surface at the respective one of the locations, the angle being arranged and the pressure of the liquid being set relative to the transverse dimension of the stream so as to cause the liquid stream to penetrate into a root zone of the crop.

12. The method according to claim 11 including arranging the angle and the pressure so as to spread the liquid within the root zone.

13. The method according to claim 11 wherein the angle is in the range 45 to 70 degrees.

14. The method according to claim 11 wherein each nozzle includes a plurality of nozzle openings each arranged at an angle to the vertical line.

15. The method according to claim 14 wherein the nozzle openings are arranged symmetrically relative to a vertical center line of the nozzle.

16. The method according to claim 15 wherein the nozzle includes two openings and is rotated about the center line so that one opening projects forwardly and to one side and the other opening projects rearwardly and to the other side.

17. The method according to claim 16 wherein the nozzle is rotated by an angle less than 45 degrees.

18. The method according to claim 15 wherein the nozzle includes four nozzle openings and wherein the nozzle is rotated about the center line so that the openings are arranged with one of the nozzle openings arranged to project forwardly and to one side, one of the nozzle openings arranged to project rearwardly and to said one side, one of the nozzle openings arranged to project forwardly and to the other side and one of the nozzle openings arranged to project rearwardly and to said other side.

19. The method according to claim 18 wherein the nozzle is rotated by an angle less than 45 degrees.

20. The method according to claim 11 including providing a pesticide in the liquid and forming a blanket of the pesticide in the soil or the root zone of the crop by providing a plurality of nozzle openings in each nozzle and directing The solid stream of liquid from each nozzle at said angle to the vertical line such that the pesticide spreads horizontally to form said blanket.

21. The method according to claim 20 wherein the nozzle includes four nozzle openings.

22. A method of killing parasites living in turf, the turf comprising a first layer of grass including leaves, a second layer of thatch having a layer of dead leaves and stems and a third layer comprising a root zone in which the roots engage into the soil, the parasites living in the thatch and the root zone, the method comprising: providing a liquid injection nozzle having at least one nozzle opening, generating a liquid under pressure for injection through the nozzle opening, shaping the nozzle opening to generate a penetrating stream of the liquid, releasing the liquid under pressure through the nozzle opening, moving the nozzle across the turf in a direction of movement such that the liquid is injected into the soil at a series of locations spaced along the direction of movement, locating the nozzle at a position above the soil surface and closely adjacent to the soil surface at a height to pass over the leaves and thatch, and directing 1:he stream of liquid at an angle to a vertical line through the soil surface at the respective one of the locations, the angle being arranged and the pressure of the liquid relative to the transverse dimension of the stream being set so as to cause the liquid stream to penetrate through the first and second layers at least into the third layer of the root zone and so as to increase the distance travelled through the thatch and the root zone to maximize the number of parasites impacted by the stream of liquid.

23. A method of applying a pesticide to an agricultural crop, the method comprising: providing a liquid injection apparatus having a plurality of nozzle openings, generating a liquid containing the pesticide under pressure for injection through the nozzle openings, shaping the nozzle openings to generate a penetrating stream of the liquid through each nozzle opening, releasing the liquid under pressure through the nozzle openings, moving the nozzle openings across the crop in a direction of movement such that the liquid is injected into the crop at a series of locations along and across the direction of movement, locating the nozzle openings at a position above a crop surface of the crop and closely adjacent to the crop surface at a height to pass over the crop, and forming a blanket of the pesticide in the soil by directing the stream of liquid from each nozzle opening at an angle to a vertical line through the soil surface at the respective one of the locations, the angle being arranged and the pressure of the liquid being set relative to the transverse dimension of the stream so as to cause the liquid stream to penetrate into a root zone of the crop and to spread horizontally to form said blanket.

24. The method according to claim 23 wherein the nozzle apparatus includes a nozzle having four nozzle openings arranged around a center line of the nozzle and wherein the nozzle is rotated about the center line so that the openings are arranged with one of the nozzle openings arranged to project forwardly and to one side, one of the nozzle openings arranged to project rearwardly and to said one side, one of the nozzle openings arranged to project forwardly and to the other side and one of the nozzle openings arranged to project rearwardly and to said other side.

25. The method according to claim 24 wherein the nozzle is rotated about the center line by an angle less than 45 degrees.

26. The method according to claim 23 wherein the angle and the pressure are set to cause the stream to expand transversely of the stream at least partly in the root zone.

* * * * *